I. A. STAFFORD.
Grain Drill.

No. 748, 31,752.

2 Sheets—Sheet 1.

Patented Mar. 19, 1861.

Fig. 1.

Fig. 2.

Attest.
Edw. F. Brown
J. B. Woodruff

Inventor.
I. A. Stafford

I. A. STAFFORD.
Grain Drill.
No. 748, 31,752.
2 Sheets—Sheet 2.
Patented Mar. 19, 1861.
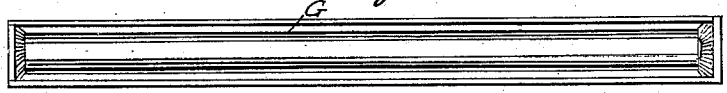
Fig. 6.
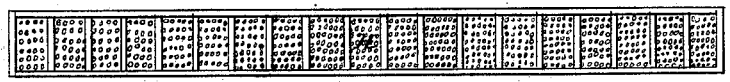
Fig. 4. Fig. 5.
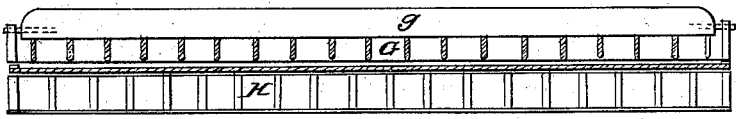
Fig. 3.
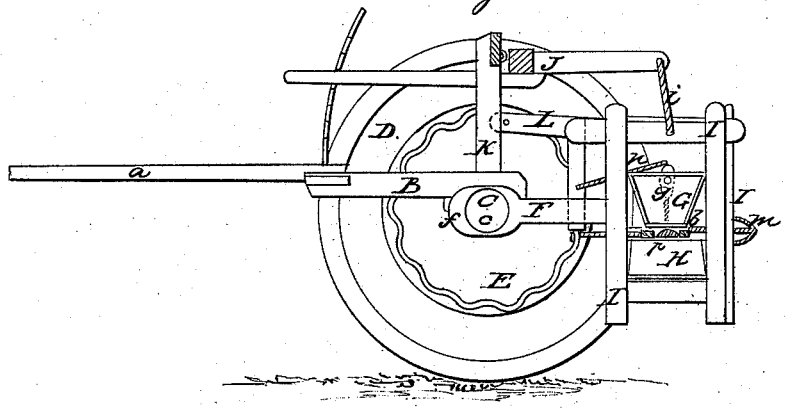
Witnesses:
Edw. F. Brown
J. B. Woodruff
Inventor:
Ira A. Stafford

UNITED STATES PATENT OFFICE.

IRA A. STAFFORD, OF ESSEX, NEW YORK.

IMPROVEMENT IN SEEDING-MACHINES.

Specification forming part of Letters Patent No. 31,752, dated March 19, 1861.

*To all whom it may concern:*

Be it known that I, IRA A. STAFFORD, of Essex, in the county of Essex and State of New York, have invented new and useful Improvements in Broadcast-Seeding Machines; and I do hereby declare that the following is a clear and exact description of the same, reference being had to the accompanying drawings, making a part of this specification.

Figure 1 represents a top view of the machine. Fig. 2 shows a rear view. Fig. 3 shows a section through an end elevation. Fig. 4 is the grain-hopper and distributing-box, showing a section through the same. Fig. 5 is a bottom view of the distributing-box. Fig. 6 is a top view of the grain-hopper detached.

My invention relates to the construction and arrangement of mechanism, as shown and set forth, for sowing grain broadcast, as hereinafter fully described.

To enable others skilled in the art to make and use my invention, I will describe the parts in detail, referring to the drawings, and to the letters marked thereon.

Like letters represent the same parts in the several figures.

The bar A, to which the shafts or thills $a\ a$ are attached, is secured to three timbers, B B B, at right angles, the rear ends forming bearings for the shaft C to revolve in. On the ends of the shaft are the axles $c\ c$ for the wheels D D to run on. To the inside end of each hub there are secured ratchet-wheels $d\ d$, into which a clutch or pawl, $e\ e$, catches, so as to drive the shaft C as the frame is moved forward and releases its hold on the ratchet when moved backward, so that the shaft will only revolve in one direction. On the shaft C, and near its center, is secured a wheel, E, it having on one of its disks, near the periphery, a zigzag groove, into which a pin or friction-roller is made to work, for the purpose of giving a shaking motion to the grain-liberating mechanism, which is attached to a frame, F, in the rear, and is secured to the shaft C by bearings $f\ f$, similar to those of the front timbers, B B.

The grain-hopper G, vibrating rack $g$, sliding bottom $h$, and distributing-box H are all secured in square frames I I I to the frame F, so that they may be elevated from the ground or depressed by the action of a lever, $j$, attached to a frame, J, by connecting links $i\ i\ i$ with the square frames I I I. The frame J is hinged to an upright frame, K, on the timbers B B.

The frame F and all of the grain holding, liberating, and distributing mechanism is adjusted and held in the desired position by a hooked rack, $k$, attached to the front bar, A, and connecting with the front end of the lever $j$.

The grain-hopper G is made with flaring sides, of any desired width and length, with a narrow opening the whole length in the bottom, having a row of bristles, or an equivalent substance, on each side, to act as brushes on the sliding bottom $h$, to force the grain through the narrow slits or opening in it into the distributing-box H. The sliding bottom may have one or more slits in it, as desired. The vibrating rack $g$ is pivoted to the ends of the hopper G, so as to work in the center, and has a row of pins or pegs on the under edge, which serve to stir the grain in the hopper, so that it will not adhere together should it get dampened or wet in the field. The sliding bottom $h$ is put in motion by a rock-shaft, L, operated by the zigzag groove in the wheel E, and is guided by the rod $l$ and strengthened by the bow-brace $m$. The vibrating rack $g$ is also operated by a connecting-rod, $n$, with the rock-shaft or elbow-lever L.

The distributing-box H is divided by cross-partitions into a number of compartments, as seen in Figs. 4 and 5. The bottom is made of woven wire or perforated sheet metal, for the grain to fall on and through. It will be distributed evenly over the surface of the ground.

Sowing grain broadcast by machinery is not so easily and perfectly effected as drilling it in; but by my arrangement of mechanism, as above described, which has been in successful operation for two seasons, it has demonstrated its practical utility and efficiency for the purpose intended over anything of the kind that has ever been introduced or tried in this section of the country.

I do not claim anything as new in the ratchet-wheels on the hubs or the zigzag wheel to give motion to the parts which operate to discharge the seed or grain from the hopper; but What I do claim as my invention, and desire to secure by Letters Patent, is—

The arrangement and combination of the hopper G, the vibrating rack $g$, the sliding bottom $h$, and the distributing-box H, substantially in the manner as herein specified, and for the purposes set forth.

IRA A. STAFFORD.

Witnesses:
EDM. F. BROWN,
J. B. WOODRUFF.